United States Patent
Dias et al.

(10) Patent No.: US 11,469,455 B2
(45) Date of Patent: Oct. 11, 2022

(54) BATTERY MONITORING SYSTEMS HAVING CONDUCTIVE STRIPS AND RELATED METHODS

(71) Applicant: Lenovo Enterprise Solutions (Singapore) Pte. Ltd., New Tech Park (SG)

(72) Inventors: Israel Silva Dias, Research Triangle Park, NC (US); Jonathan Keener Grice, Research Triangle Park, NC (US); John Thomas McAlpin, Research Triangle Park, NC (US); Emil Paul Parker, Research Triangle Park, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 345 days.

(21) Appl. No.: 16/593,201

(22) Filed: Oct. 4, 2019

(65) Prior Publication Data
US 2021/0104783 A1    Apr. 8, 2021

(51) Int. Cl.
*H01M 10/48*     (2006.01)
*H01M 10/42*     (2006.01)

(52) U.S. Cl.
CPC ....... *H01M 10/48* (2013.01); *H01M 10/4285* (2013.01)

(58) Field of Classification Search
CPC ............. H01M 10/48; H01M 10/4285; H01M 10/0445; H01M 10/441; H01M 10/425; H02J 7/0031; H02J 7/0025; H02J 7/0013; H02J 7/0063; H02J 7/00718; H02J 7/0029; H02J 7/00304; Y02E 60/10

USPC ..... 324/415, 435, 437, 426–433, 76.11, 126, 324/500, 756.05, 538

See application file for complete search history.

(56) References Cited

U.S. PATENT DOCUMENTS

| | | |
|---|---|---|
| 8,513,919 B2 | 8/2013 | Bhardwaj et al. |
| 8,691,408 B2 | 4/2014 | Hong et al. |
| 10,158,149 B2 | 12/2018 | Albert et al. |
| 2014/0002269 A1 | 1/2014 | Zhou |
| 2014/0087231 A1* | 3/2014 | Schaefer ............... H01M 50/20 429/120 |
| 2016/0064780 A1* | 3/2016 | Jarvis .................... H01M 10/48 429/61 |

FOREIGN PATENT DOCUMENTS

CN    2702450 Y  *  5/2004  ............. H01M 2/34

* cited by examiner

*Primary Examiner* — Patrick Assouad
*Assistant Examiner* — Trung Q Nguyen
(74) *Attorney, Agent, or Firm* — Olive Law Group, PLLC

(57) ABSTRACT

Battery monitoring systems having conductive strips and related methods are disclosed herein. According to an aspect, a battery monitoring system includes a conductive strip having a first end and a second end. The system also includes conductivity measurement circuitry operatively connected to the first end and the second end of the conductive strip. The conductivity measurement circuity is configured to indicate whether conductivity between the first end and the second end meets a predetermined threshold. Further, the system includes a strap attached to at least one of the first end and the second end, configured to attach to a battery, and configured to apply tension to the conductive strip when attached to the battery.

18 Claims, 6 Drawing Sheets

BATTERY MONITORING SYSTEMS HAVING CONDUCTIVE STRIPS AND RELATED METHODS

TECHNICAL FIELD

The presently disclosed subject matter relates generally to battery monitoring. Particularly, the presently disclosed subject matter relates to battery monitoring systems having conductive strips and related methods.

BACKGROUND

Many electronic devices have rechargeable batteries. Examples includes notebook computers, smartphones, and tablet computers. Designs for such batteries often include battery packs that contain battery cells connected together in various series and parallel configurations. The charge in such batteries is typically managed by a circuit, which is commonly known as a protection circuit module (PCM) and/or battery management unit (BMU).

During operation, a battery's capacity may diminish over time from use, age, lack of maintenance, damage, heat, and/or manufacturing defects. For example, oxidation of electrolyte and/or degradation of cathode and anode material within a battery may be caused by repeated charge cycles and/or age, which in turn may cause a gradual reduction in the battery's capacity. As the battery continues to age and degrade, the capacity's rate of reduction may increase.

Subsequent use of a battery beyond the battery's end-of-life may cause swelling of the battery's cells and may potentially damage the electronic device that is powered by the battery, which providing little power to the electronic device. The battery may swell due to pressure from internal gas or a chemical reaction inside the battery, which is potentially hazardous. Swelling of a battery may be caused by various factors. For example, it may result from over-charging, over-discharging, an internal short circuit, an external short circuit, and external heat.

Current battery-monitoring systems may not include functionality to manage swelling of the battery. As a result, a user of the electronic device may not be aware of the battery's swelling and/or degradation until the swelling results in damage to the electronic device, which can possibly involve a fire and/or an explosion. For at least these reasons, there is a need for improved systems and methods for managing battery swelling and alerting users to battery swelling.

BRIEF DESCRIPTION OF THE DRAWINGS

Figure 1:
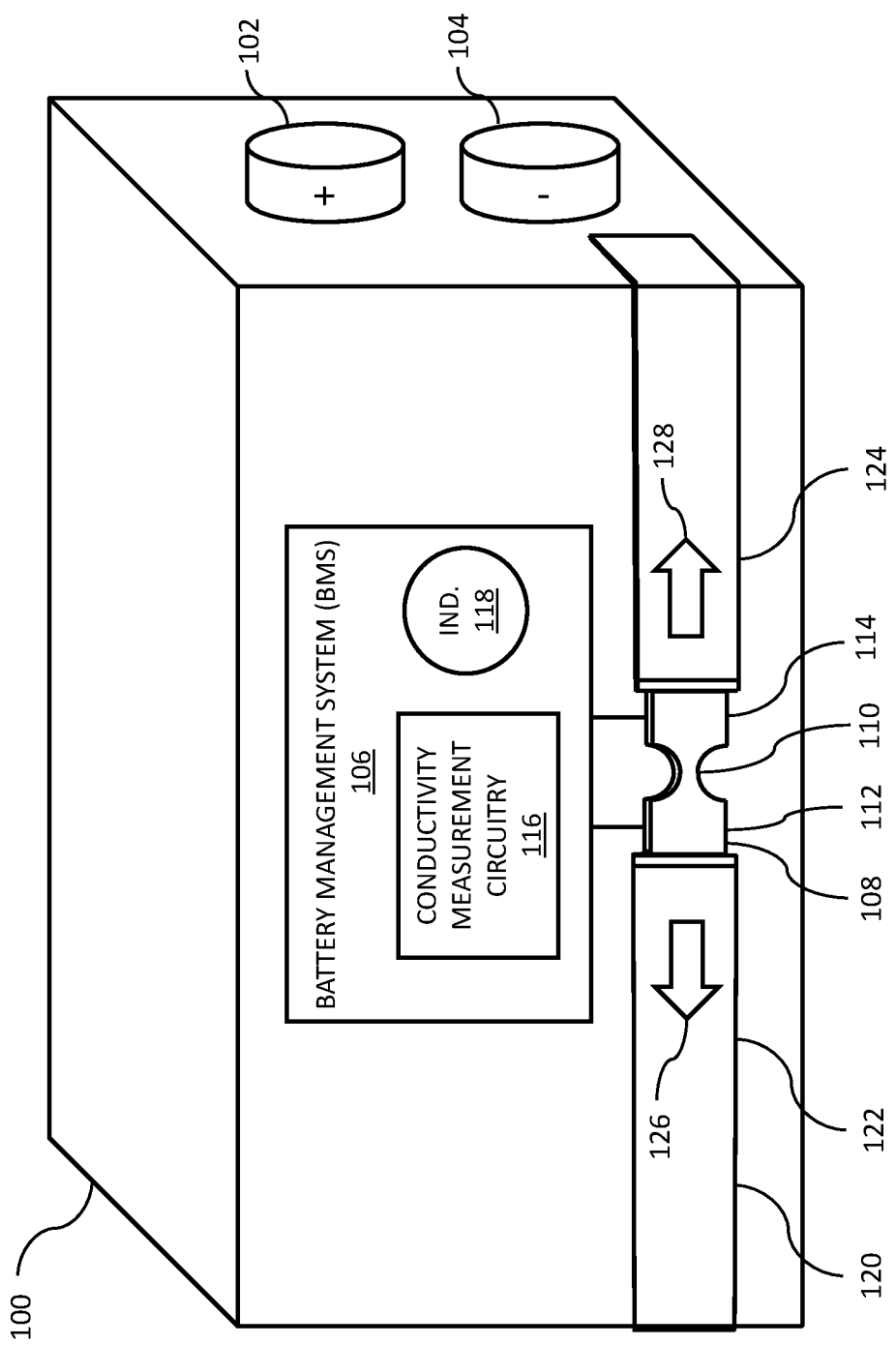
Figure 2:
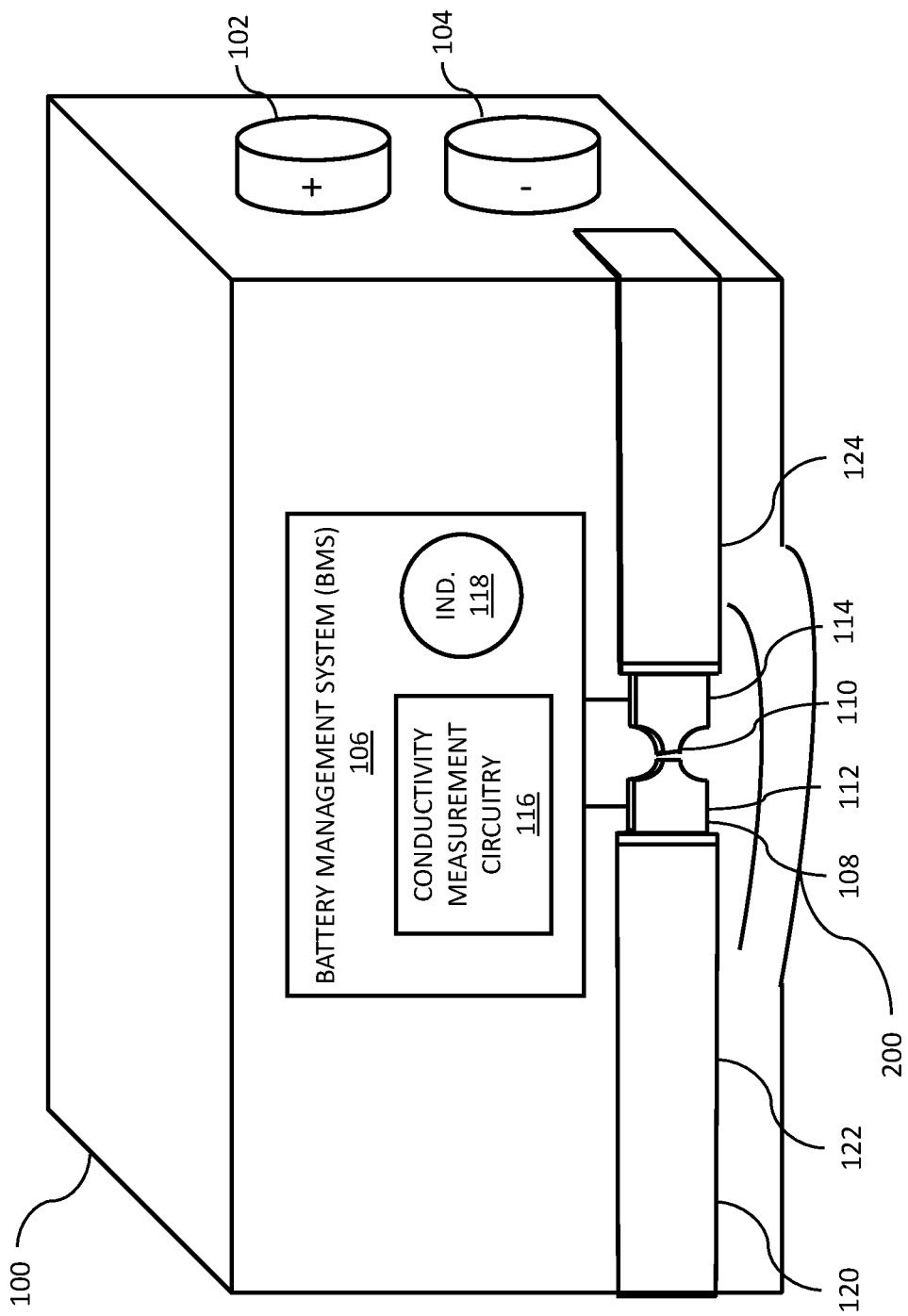
Figure 3:
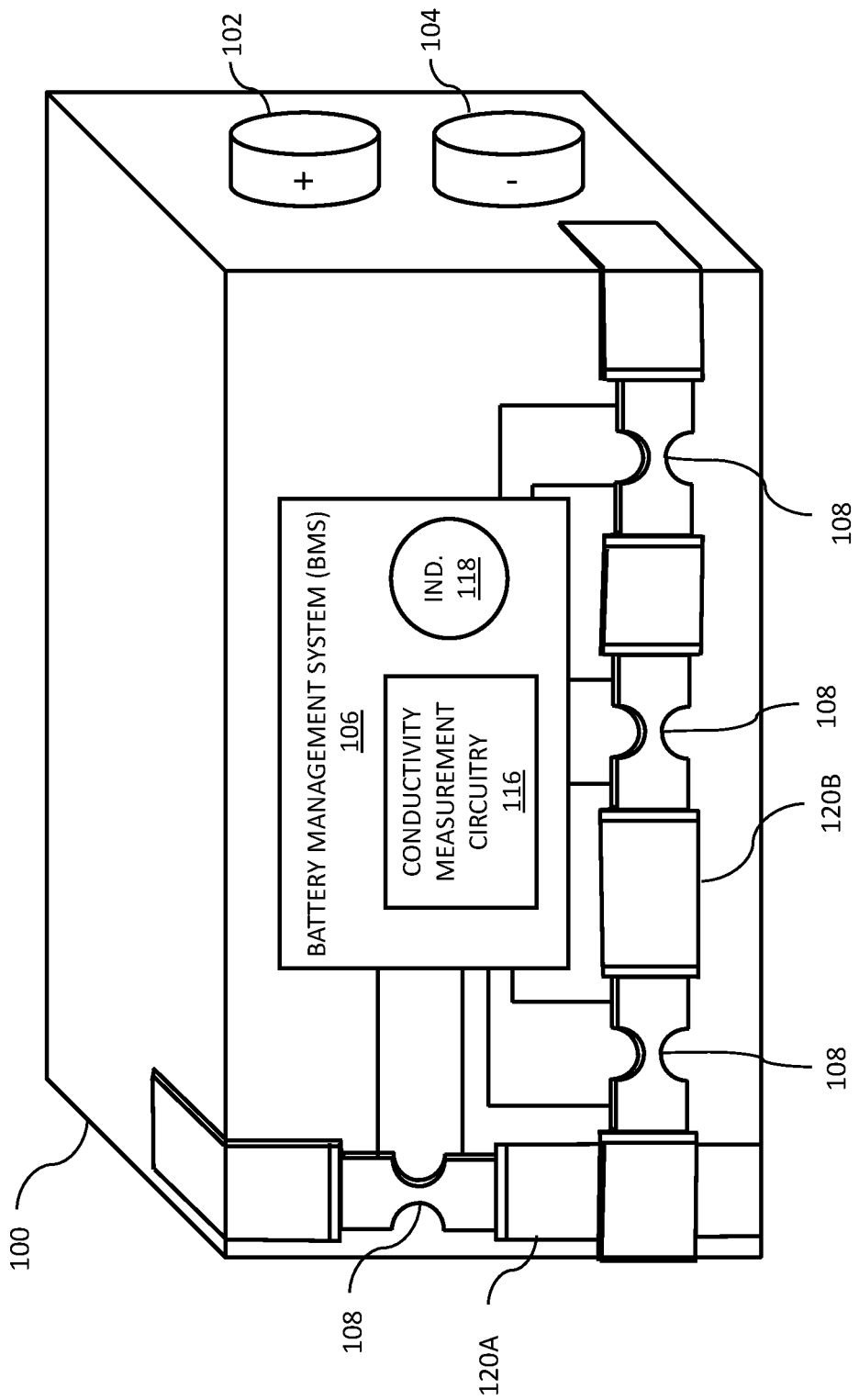
Figure 4:
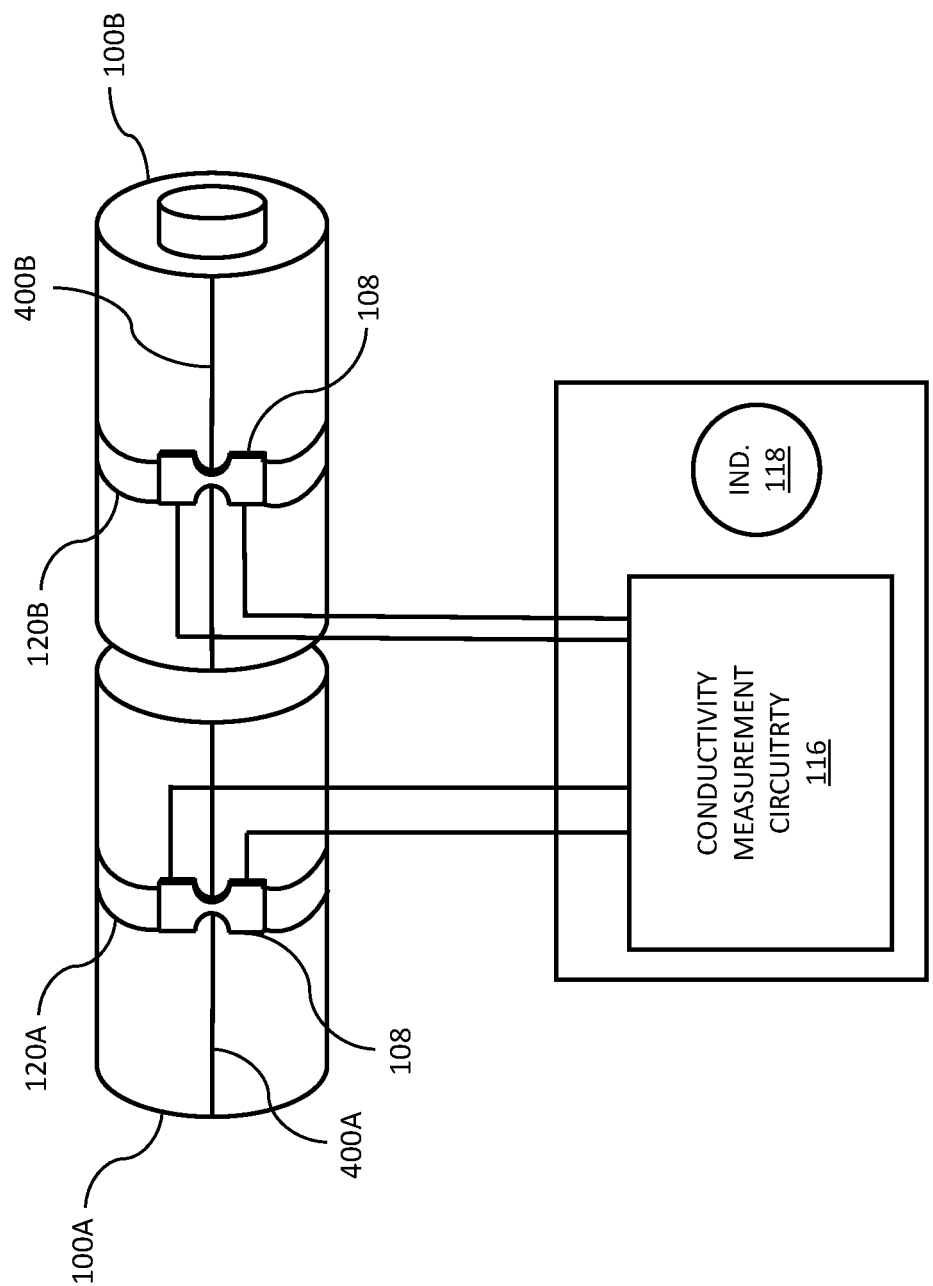
Figure 5:
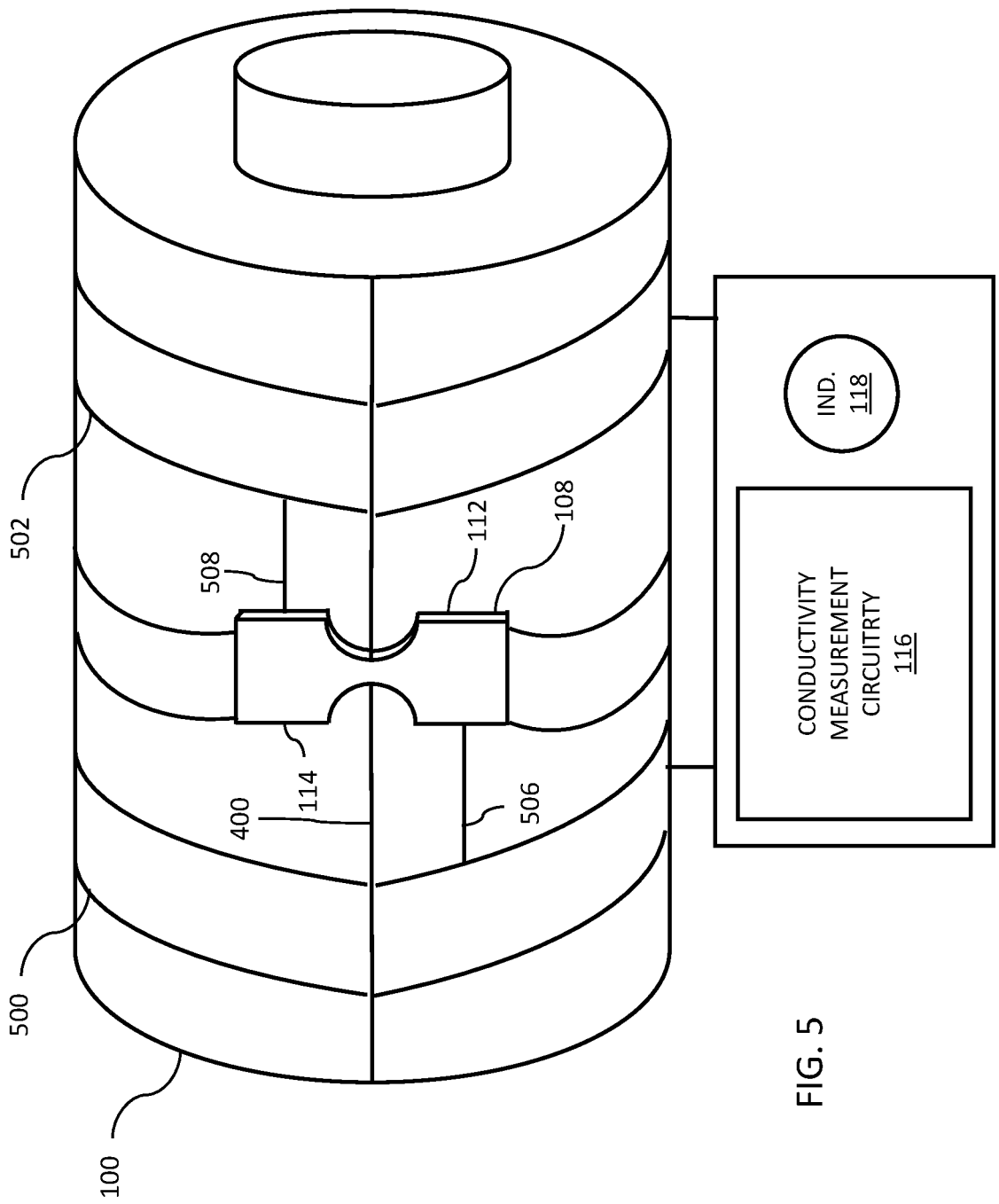
Figure 6:
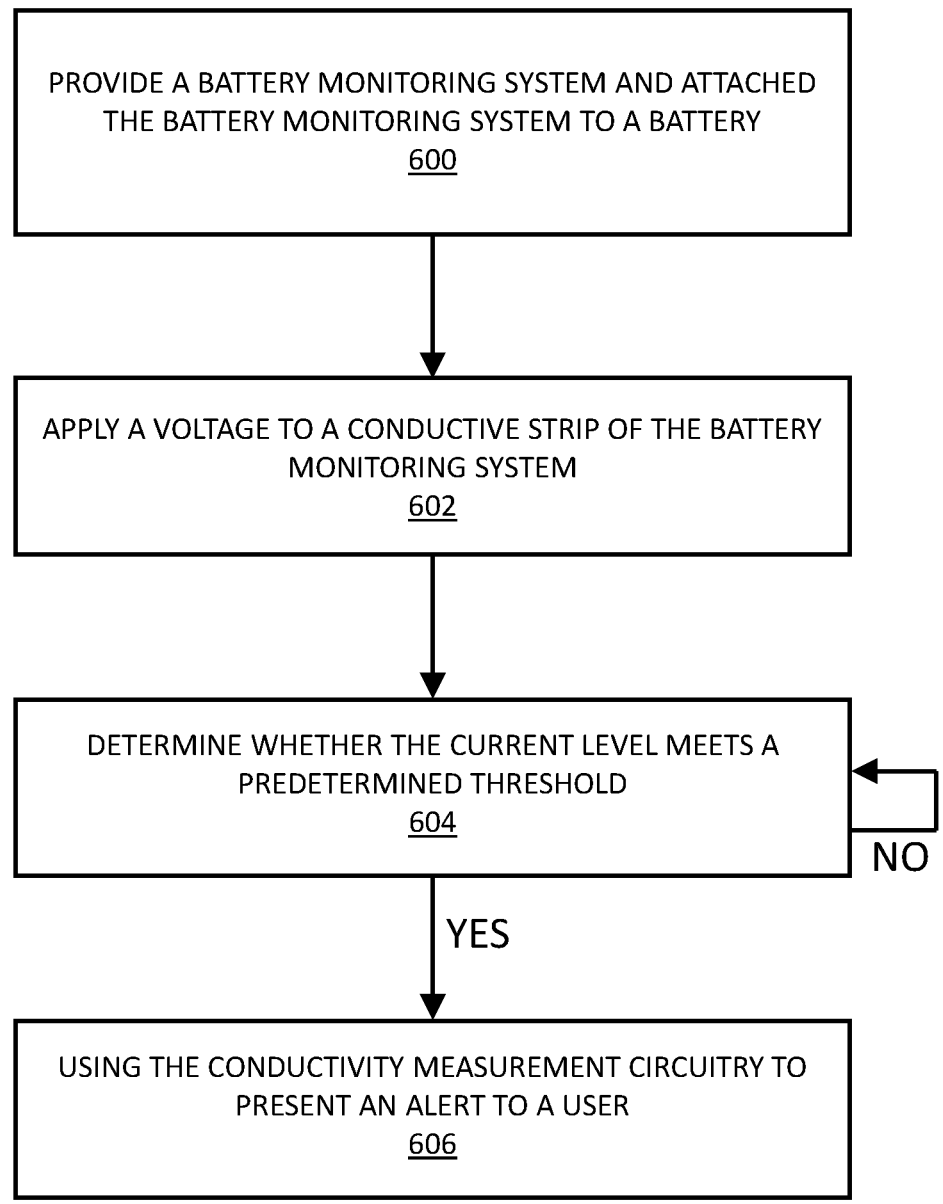

Having thus described the presently disclosed subject matter in general terms, reference will now be made to the accompanying Drawings, which are not necessarily drawn to scale, and wherein:

FIG. 1 is a diagram of a battery having a battery monitoring system operably attached thereto in accordance with embodiments of the present disclosure;

FIG. 2 is a diagram of the battery that shows a portion of expansion sufficient to break the conductive strip at the narrowed portion;

FIG. 3 is a diagram of a battery having another example battery monitoring system operably attached thereto in accordance with embodiments of the present disclosure;

FIG. 4 is a diagram of batteries operably connected in a series arrangement and having a battery monitoring system operably attached thereto in accordance with embodiments of the present disclosure;

FIG. 5 is a diagram of another example cylindrically-shaped battery having a battery monitoring system operably attached thereto in accordance with embodiments of the present disclosure; and FIG. 6 is a flow chart of an example method for battery monitoring in accordance with embodiments of the present disclosure.

SUMMARY

The presently disclosed subject matter battery monitoring systems having conductive strips and related methods. According to an aspect, a battery monitoring system includes a conductive strip having a first end and a second end. The system also includes conductivity measurement circuitry operatively connected to the first end and the second end of the conductive strip. The conductivity measurement circuity is configured to indicate whether conductivity between the first end and the second end meets a predetermined threshold. Further, the system includes a strap attached to at least one of the first end and the second end, configured to attach to a battery, and configured to apply tension to the conductive strip when attached to the battery.

According to another aspect, a method of monitoring a battery includes providing a battery monitoring system. The system includes a conductive strip having a first end and a second end. The system also includes conductivity measurement circuitry operatively connected to the first end and the second end of the conductive strip. Further, the conductivity measurement circuity is configured to indicate whether conductivity between the first end and the second end meets a predetermined threshold. The system also includes a strap attached to at least one of the first end and the second end. The method also includes attaching the strap a battery such that tension is applied to the conductive strip.

According to another aspect, a method of monitoring a battery includes providing a battery monitoring system. The system includes a conductive strip having a first end and a second end. The system also includes conductivity measurement circuitry operatively connected to the first end and the second end of the conductive strip. The conductivity measurement circuity is configured to indicate whether conductivity between the first end and the second end meets a predetermined threshold. Further, the system includes a strap attached to at least one of the first end and the second end, and attached to a battery such that tension is applied to the conductive strip. The method also includes using the conductivity measurement circuitry to present an alert to a user when the conductivity between the first end and the second end meets the predetermined threshold.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

As referred to herein, a "battery" is a device having one or more electrochemical cells with external connections provided to power electronic devices. Example electronic devices include, but are not limited to, computing devices, smartphones, electric automobiles, flashlights, and the like. A battery may have two terminals: a positive terminal and a negative terminal. The negative terminal is the source of electrons that can flow through an electronic device to the positive terminal. Primary (single-use or "disposable") batteries are used once and discarded. Secondary (rechargeable) batteries can be discharged and recharged multiple times using an applied electric current.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

FIG. 1 illustrates a diagram of a battery 100 having a battery monitoring system operably attached thereto in accordance with embodiments of the present disclosure. Referring to FIG. 1, the battery 100 in this example is a smart battery operable for powering a laptop, notebook computer, or any other suitable electronic device. Although, it is noted that the battery 100 may be any other suitable type of battery. The battery 100 includes a positive terminal 102 and a negative terminal 104 that may be operatively connected to a laptop computer.

The battery 100 includes a battery management system (BMS) 106 operable to measure voltage and current, and deduce charge level and state of health (SoH) parameters indicating the state of cells of the battery 100. Externally, the battery 100 may communicate with a smart battery charger and a "smart energy user" via a bus interface (not shown). The BMS 106 may request that charging stop, charging start, or request that the smart energy user stop using power from the battery. The BMS 106 may include suitable hardware, software, firmware, or combinations thereof for implementing these functions.

In accordance with embodiments, the battery monitoring system operatively connected to the battery 100 may include a conductive strip 108 for determining whether the battery 100 has physically expanded or swollen to sufficient degree such that the battery 100 is unsuitable for continued use. Particularly, the conductive strip 108 may define a narrowed portion 110 that is configured to break apart or otherwise separate between ends 112 and 114 such that there is no longer electrical conductivity between ends 112 and 114. The conductive strip 108 may break apart when the battery 100 swells or expands sufficiently at or about a portion of the battery 100 where the conductive strip 108 is located. The breakage is due to the tension force caused at this expanded or swollen portion of the battery 100 such that ends 112 and 114 are pulled apart from one another such that the conductive strip 108 breaks at the narrowed portion 110. FIG. 2 illustrates a diagram of the battery 100 that shows a portion 200 of expansion sufficient to break the conductive strip 108 at the narrowed portion. Conductivity measurement circuitry 116 may be operably connected to the conductive strip 108 to detect whether there is conductivity between operatively connected to ends 112 and 114 of the conductive strip 108. If there is conductivity, it may be assumed that the battery 100 has not swollen to an unsafe condition. If there is not conductivity, it may be assumed that the battery 100 has expanded or swollen to an unsafe condition.

The conductivity measurement circuitry 116 is configured to monitor conductivity between ends 112 and 114 and to indicate whether conductivity between ends 112 and 114 meets a predetermined threshold. Particularly, the conductivity measurement circuitry 116 may apply a voltage across ends 112 and 114 to cause a current to flow from end 112 to end 114, or end 114 to end 112, depending on application of the voltage polarity. The voltage may be applied by a suitable voltage source. Further, the conductivity measurement circuitry 116 may sense the current and determine whether the current level meets a predetermined threshold, thus determining whether there is conductivity between ends 112 and 114.

In accordance with embodiments, the BMS 106 includes an indicator 118 configured to present an alert to a user when the conductive strip 108 breaks. Particularly, the BMS 106 may control the indicator 118 to present the alert in response to determining that the current level meets the predetermined threshold, or that there is no conductivity between ends 112 and 114. The indicator 118 may be a light source (e.g., light emitting diode (LED)), speaker (or other audible alarm), other indicator, or combinations thereof for alerting the user to the unsafe condition of the battery 100.

Alternative or in combination with the indicator 118 in accordance with embodiments, the conductivity measurement circuitry 116 may operate together with the BMS 106 to communicate a message to a management system of the electronic device being powered by the battery 100 to inform the management system of a condition of the battery 100. In response to determining that the current level meets the predetermined threshold, the conductivity measurement circuitry 116 may indicate this to the BMS 106, which may subsequently communicate the information to the electronic device's management system. The management system may subsequently alert the user.

In accordance with embodiments, the battery monitoring system includes a strap 120 attached to the conductive strip 108 and configured to apply tension to the conductive strip 108 when attached to the battery 100. In this example, the conductive strip 120 includes portions 122 and 124 that are attached to ends 112 and 114, respectively, of the conductive strip 108. The portions 122 and 124 are attached to ends 112 and 114 and the battery 100 such that tension is applied to the conductive strip 108. Particularly, ends 112 and 114 are pulled by the strap 120 in the directions indicated by direction arrows 126 and 128, respectively. In this way, a force may be applied to the narrowed portion 110 such that additional force caused by expansion or swelling of the battery at an unsafe or failure condition can cause the conductive strip 108 to break at the narrowed portion 110 as shown in FIG. 2.

The strap 120 may be made of any suitable material, sized and shaped in any suitable form, assembled of any suitable components, and attached to the battery 100 in any suitable way for holding the conductive strip 108 to the battery 100 such that the conductive strip 108 breaks once the battery 100 expands or swells sufficiently (i.e., expands or swells to a point where the battery 100 can be assumed to be at an unsafe or failure condition). In an example, the strap 120 is made of a polymer material, which is made into lengths of material, attached to ends 112 and 114 of the conductive strip 108, and wrapped around ends of the battery 100 to hold the conductive strip 108 to the battery 100 as shown in FIGS. 1 and 2.

The conductive strip 108 may be made of metal or any other suitable conductive material. Example materials for the conductive strip 108 include, but are not limited to, copper, tin, aluminum, gold, nickel, the like or combinations thereof. Further, the material of the conductive strip 108 may be rubberized or encased in plastic to insulate from electrical current from outside and prevent electrostatic discharge. The narrowed portion 108 is shaped and sized such that it provides a break point when sufficient tension force is applied thereto. This sufficient tension force may be when the battery 100 expands or swells such that it is in an unsafe or failure condition. Shape of the conductive strip 108 may be according to the designed expansion force of that battery. The narrowed portion 108 may be shaped as a narrowed segment of a strip, or a round-section single metal wire. Using standardized wire gauges, the tensile strength can be very predictable, providing a good level of precision to evaluate the degree of deformation.

In the embodiments shown in FIGS. 1 and 2, the strap 120 is a thermo-contractible strap. During attachment to the battery 100, heat may be suitably applied to the strap 120 to shrink the strap 120 such that it fits tightly and securely to the battery 100. In this way, the strap 120 can applied the aforementioned tension force to the conductive strip 108.

FIG. 3 illustrates a diagram of a battery 100 having another example battery monitoring system operably attached thereto in accordance with embodiments of the present disclosure. Referring to FIG. 3, the battery monitoring system includes a BMS 106, conductivity measurement circuitry 116, and an indicator 118. The conductivity measurement circuitry 116 is operably connected to multiple conductive strips 108 that are configured in accordance with embodiments of the present disclosure. The conductivity measurement circuitry 116 may individually monitor each of the conductive strips 108 to determine whether conductivity between each of their respective ends meets a predetermined threshold. In response to determining that either do not meet the predetermined threshold, the conductivity measurement circuitry 116 may control the indicator 118 to present an alert to the user. Alternatively, the conductivity measurement circuitry 116 may operate together with the BMS 106 to communicate a message to a management system of the electronic device being powered by the battery 100 to inform the management system of a condition of the battery 100. The management system may subsequently alert the user.

With continuing reference to FIG. 3, the conductive strips 108 are held to the battery 100 by two straps 120A and 120B. Strap 120A holds a single conductive strip 108 to the battery. Strap 120B holds several conductive strips 108 to the battery 100. Also, straps 120A and 120B are aligned substantially perpendicular with respect to each other. This arrangement of multiple straps and multiple conductive strips can more accurately monitor battery expansion and swelling than fewer conductive straps and conductive strips. This may be desired in the instance of a need for such better accuracy. In the case of strap 120B, its respective conductive strips 108 are arranged in series for more accurate monitoring of expansion or swelling along the strap 120B at locations near or at the respective conductive strip 108.

FIG. 4 illustrates a diagram of batteries 100A and 100B operably connected in a series arrangement and having a battery monitoring system operably attached thereto in accordance with embodiments of the present disclosure. Referring to FIG. 4, the battery monitoring system includes conductivity measurement circuitry 116 and an indicator 118. The conductivity measurement circuitry 116 is operably connected to conductive strips 108 that are configured in accordance with embodiments of the present disclosure. In this example, each conductive strip 108 is attached to its own battery 100A, 100B. The conductivity measurement circuitry 116 may individually monitor each of the conductive strips 108 to determine whether conductivity between each of their respective ends meets a predetermined threshold. In response to determining that either do not meet the predetermined threshold, the conductivity measurement circuitry 116 may control the indicator 118 to present an alert to the user.

With continuing reference to FIG. 3, the conductive strips 108 are held to the battery 100 by respective straps 120A and 120B. In this example, the batteries 100A and 100B are cylindrical in shape and have an exterior feature 400A and 400B, respectively, where expansion of the respective battery can be expected when the battery is in an unsafe or failure condition. The features 400A and 400B are the folded-over areas of the outside coverings of the batteries 100A and 100B, respectively, where expansion or swelling occurs. The conductive strips 108 are positioned over these features 400A and 400B to accurately detect expansion upon breakage of the strip in accordance with embodiments disclosed herein.

FIG. 5 illustrates a diagram of another example cylindrically-shaped battery 100 having a battery monitoring system operably attached thereto in accordance with embodiments of the present disclosure. Referring to FIG. 5, the battery monitoring system includes conductivity measurement circuitry 116 and an indicator 118. The conductivity measurement circuitry 116 is operably connected to conductive strips 108 that are configured in accordance with embodiments of the present disclosure. In this example, conductive strip 108 is positioned over the feature 400 where expansion or swelling of the battery 100 is expected when the battery 100 is in an unsafe or failure condition. The conductivity measurement circuitry 116 may monitor the conductive strips 108 to determine whether conductivity between each of their respective ends meets a predetermined threshold. In response to determining that either do not meet the predetermined threshold, the conductivity measurement circuitry 116 may control the indicator 118 to present an alert to the user.

In accordance with embodiments, the battery monitoring system includes conductive layers 500 and 502 that extend around the battery 100. In this example, the conductive layers 500 and 502 are electrically connected to ends 112 and 114, respectively, of the conductive strip 108 by traces 504 and 506, respectively. The conductive layers 500 and 502 and traces 504 and 506 may provide electrical conduction between the conductive strip 108 and the conductivity measurement circuitry 116.

FIG. 6 illustrates a flow chart of an example method for battery monitoring in accordance with embodiments of the present disclosure. The method is described by example as being implemented by the battery monitoring system shown in FIGS. 1 and 2, although it should be understood that it may also be suitably applied for use in the systems shown in FIGS. 3-5 or any other suitable battery monitoring system.

Referring to FIG. 6, the method includes providing a battery monitoring system and attaching 600 the battery monitoring system to a battery. For example, the battery monitoring system may be provided and attached to the battery 100 as shown in FIG. 1. The portions 122 and 124 of the strap 120 may be made of thermo-contractible material. This thermo-contractible strap 120 may be placed against the outside surface of the battery 100. Subsequently, warm or hot air may be applied to these portions 122 and 124 such that the thermo-contractible strap attaches to the outside surface of the battery 100. Further, the attachment may cause a tension force to be applied to the ends 112 and 114 as disclosed.

The method of FIG. 6 includes applying 602 a voltage to a conductive strip of the battery monitoring system to cause a current to flow between ends of the conductive strip. Continuing the aforementioned example, the conductivity measurement circuitry 116 may apply voltage across ends 112 and 114 to cause a current to flow from end 112 to end 114, or end 114 to end 112, depending on application of the voltage polarity.

The method of FIG. 6 includes determining 604 whether the current level meets a predetermined threshold. Continuing the aforementioned example, the conductivity measurement circuitry 116 may determine whether the current level meets a predetermined threshold. If the current level does not meet the threshold (e.g., current flows across the ends 112 and 114), then the method may continue monitoring the current level by remaining at step 604. On the other hand, if the current level meets the threshold (e.g., current does not flow across the ends 112 and 114 due to breakage of the conductive strip 108), the method may include using 606 the conductivity measurement circuitry to present an alert to a user. For example, the indicator 118 may be controlled to present the alert.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In accordance with other embodiments, the narrowed portion 108 may be designed as a corrosion indicator for the battery. For example, the metal of the narrowed portion 108 may match the battery and thus corrode similarly or the same when exposed to the environment of the battery. In this case, the narrowed portion 108 may break sooner than the battery is corroded to a degree of being unsafe or an unusable condition. The indicator may subsequently indicate the breakage of the conductive strip to indicate the level of corrosion.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A battery monitoring system comprising:
a conductive strip having a first end and a second end;
conductivity measurement circuitry operatively connected to the first end and the second end of the conductive strip, and the conductivity measurement circuitry being configured to indicate whether conductivity between the first end and the second end meets a predetermined threshold; and
a strap attached to at least one of the first end and the second end, configured to attach to a battery, and configured to apply tension to the conductive strip when attached to the battery, wherein the tension applied by the strap is configured to cause the conductive strip to break based on an expansion or swelling of the battery at an unsafe or failure condition.

2. The battery monitoring system of claim 1, wherein the conductive strip comprises metal.

3. The battery monitoring system of claim 1, wherein the conductive strip defines a narrowed portion between the first end and the second end such that the conductive strip separates at the narrowed portion when a predetermined tension force is applied between the first end and the second end.

4. The battery monitoring system of claim 1, wherein the conductivity measurement circuitry is configured to apply a voltage across the first end and the second end of the conductive strip.

5. The battery monitoring system of claim 1, wherein the conductivity measurement circuitry comprises an indicator configured to present an alert to a user when the conductivity between the first end and the second end meets the predetermined threshold.

6. The battery monitoring system of claim 1, wherein the strap is a thermo-contractible strap that shrinks upon application of heat for attaching to the battery.

7. The battery monitoring system of claim 1, wherein the strap is thermo-contractible strap that comprises a first portion and a second portion attached to the first end and the second end, respectively, of the conductive strip, wherein the first and second portions shrink upon application of heat for attaching to the battery and for applying tension to the conductive strip.

8. A method of monitoring a battery, the method comprising:
providing a battery monitoring system comprising:
a conductive strip having a first end and a second end;
conductivity measurement circuitry operatively connected to the first end and the second end of the conductive strip, and the conductivity measurement circuitry being configured to indicate whether conductivity between the first end and the second end meets a predetermined threshold; and a strap attached to at least one of the first end and the second end; and attaching the strap a battery such that tension is applied to the conductive strip, wherein the tension applied by the strap is configured to cause the conductive strip to break based on an expansion or swelling of the battery at an unsafe or failure condition.

9. The method of claim 8, wherein the conductive strip comprises metal.

10. The method of claim 8, wherein the conductive strip defines a narrowed portion between the first end and the second end such that the conductive strip separates at the narrowed portion when a predetermined tension force is applied between the first end and the second end.

11. The method of claim 8, further comprising applying a voltage across the first end and the second end of the conductive strip.

12. The method of claim 8, wherein the strap is a thermo-contractible strap that shrinks upon application of heat for attaching to the battery; and wherein attaching the thermo-contractible strap to the battery comprises:

placing the thermo-contractible strap against an outside surface of the battery; and applying heat to the thermo-contractible strap such that the thermo-contractible strap attaches to the outside surface of the battery.

13. The method of claim 8, wherein the strap is a thermo-contractible strap comprising a first portion and a second portion attached to the first end and the second end, respectively, of the conductive strip, wherein the first and second portions shrink upon application of heat for attaching to the battery and for applying tension to the conductive strip.

14. A method of monitoring a battery, the method comprising:

providing a battery monitoring system comprising:

a conductive strip having a first end and a second end;

conductivity measurement circuitry operatively connected to the first end and the second end of the conductive strip, and the conductivity measurement circuitry being configured to indicate whether conductivity between the first end and the second end meets a predetermined threshold; and a strap attached to at least one of the first end and the second end, and attached to a battery such that tension is applied to the conductive strip, wherein the tension applied by the strap is configured to cause the conductive strip to break based on an expansion or swelling of the battery at an unsafe or failure condition; and using the conductivity measurement circuitry to present an alert to a user when the conductivity between the first end and the second end meets the predetermined threshold.

15. The method of claim 14, wherein the conductive strip comprises metal.

16. The method of claim 14, wherein the conductive strip defines a narrowed portion between the first end and the second end such that the conductive strip separates at the narrowed portion when a predetermined tension force is applied between the first end and the second end.

17. The method of claim 14, further comprising applying a voltage across the first end and the second end of the conductive strip.

18. The method of claim 14, wherein the strap is a thermo-contractible comprising a first portion and a second portion attached to the first end and the second end, respectively, of the conductive strip, wherein the first and second portions shrink upon application of heat for attaching to the battery and for applying tension to the conductive strip.

* * * * *